(12) United States Patent  (10) Patent No.: US 9,079,344 B2
Vad et al.  (45) Date of Patent: Jul. 14, 2015

(54) METHOD FOR INJECTION MOLDING A PUMP IMPELLER AND PUMP IMPELLER

(75) Inventors: Martin Vad, Randers NØ (DK); Morten Holst Bogh, Hobro (DK)

(73) Assignee: Grundfos Management a/s, Bjerringbro (DK)

( * ) Notice: Subject to any disclaimer, the term of this patent is extended or adjusted under 35 U.S.C. 154(b) by 1010 days.

(21) Appl. No.: 13/141,716

(22) PCT Filed: Dec. 19, 2009

(86) PCT No.: PCT/EP2009/009167
§ 371 (c)(1),
(2), (4) Date: Jul. 8, 2011

(87) PCT Pub. No.: WO2010/072385
PCT Pub. Date: Jul. 1, 2010

(65) Prior Publication Data
US 2011/0262282 A1 Oct. 27, 2011

(30) Foreign Application Priority Data
Dec. 24, 2008 (EP) ..................................... 08022457

(51) Int. Cl.
*B23P 15/04* (2006.01)
*B29C 45/44* (2006.01)
*B29C 33/48* (2006.01)
*F04D 29/22* (2006.01)
*B29L 31/08* (2006.01)

(52) U.S. Cl.
CPC ........... *B29C 45/4421* (2013.01); *B29C 33/485* (2013.01); *F04D 29/2222* (2013.01); *B29L 2031/087* (2013.01)

(58) Field of Classification Search
USPC ................. 29/889, 889.3; 249/145, 176, 184; 425/468
See application file for complete search history.

(56) References Cited

U.S. PATENT DOCUMENTS

| 4,732,541 A | 3/1988 | Hyll |
| 4,998,706 A * | 3/1991 | Hyll .............................. 249/184 |
| 6,413,039 B1 * | 7/2002 | Morris et al. ................. 415/111 |

FOREIGN PATENT DOCUMENTS

| EP | 0734834 A1 | 10/1996 |
| JP | 9-250492 A | 9/1997 |
| JP | 10-202701 A | 8/1998 |
| JP | 11-277583 A | 10/1999 |
| WO | 2007046565 A1 | 4/2007 |

OTHER PUBLICATIONS

Int'l Search Report issued Apr. 12, 2010 in Int'l Application No. PCT/EP2009/009167.

* cited by examiner

*Primary Examiner* — Richard Chang
(74) *Attorney, Agent, or Firm* — Panitch Schwarze Belisario & Nadel LLP

(57) ABSTRACT

A method for injection molding a pump impeller (1) of plastic, with which the cores which define the flow channels (8) in the inside of the impeller (1), are formed in each case of at least two core parts (26, 30). After the injection molding, a first core part (26) is firstly pulled out of the flow channel (8) and subsequently, an additional relative movement between the impeller (1) and the core part (30) is effected in a direction transverse to the pulling direction of the second core part (30), before or during the pulling-out of a second core part (30).

10 Claims, 10 Drawing Sheets

METHOD FOR INJECTION MOLDING A
PUMP IMPELLER AND PUMP IMPELLER

CROSS-REFERENCE TO RELATED APPLICATIONS

This application is a Section 371 of International Application No. PCT/EP2009/009167, filed Dec. 19, 2009, which was published in the German language on Jul. 1, 2010, under International Publication No. WO 2010/072385 and the disclosure of which is incorporated herein by reference.

BACKGROUND OF THE INVENTION

The present invention relates generally to a method for injection molding a pump impeller, as well as to a pump impeller manufactured accordingly.

Pump impellers, in particular impellers of centrifugal pumps or rotatory pumps, typically include a plurality of blades, between which channels are defined, which extend from the center of the impeller to the outer periphery, usually along a curved path. With closed impellers, the blades are thereby formed between two cover plates which are distanced to one another, so that the flow channels at least in a section are only open to the inner periphery and to the outer periphery of the impeller.

The manufacture of such impellers is quite complicated, since the cavities which define the flow channels between the blades, may not be formed without further ado. It is thus known to compose the impellers of several parts, be they of plastic or metal. Thus, the blades may be formed on a cover plate, and then for example the second cover plate may be welded onto the end-edges of the blades. With such a design, the cover plate with the blades may also be manufactured in an inexpensive manner as a cast part, be it of metal or plastic. If a closed impeller is to be manufactured as one piece as a cast part, until now this was only possible with the help of a lost cores, since on account of the geometry of the flow channels, which is optimized with regard to flow technology, undercuts arise in these channels, which prevent the withdrawal of the cores in the longitudinal direction of the flow channels.

For reasons of cost, it is however desirable to cast such impellers as one piece, for example as injection molded parts of plastic. Thus, further assembly steps which are required for putting together multi-part impellers are done away with.

BRIEF SUMMARY OF THE INVENTION

An objective of a preferred embodiment of the present invention is to provide a method for injection molding a pump impeller, which permits a single-piece design of the pump impeller as a cast part and which may make do without lost cores.

The above objective is achieved by a method for injection molding a pump impeller, with which the cores which define flow channels in the inside of the impeller are formed in each case of at least two core parts, of which, after the injection molding, a first core part is firstly pulled out of the flow channel along a curved path and subsequently, an additional relative movement between the impeller and the core part is effected in a direction transverse to the pulling direction of the second core part, before or during the pulling-out of a second core part, as well as by a corresponding pump impeller with two axially distanced cover plates and impeller blades arranged between the cover plates, wherein the two cover plates and the impeller blades are manufactured as one piece with injection molding. Preferred embodiments of the present invention are to be deduced from the subsequent description, as well as the attached figures.

The method according to a preferred embodiment of the present invention for injection molding a pump impeller is suitable for the manufacture of the pump impeller of plastic, as well as for manufacture of metal, i.e. with die-casting. According a preferred embodiment of the present invention, with the method, the cores which define the flow channels in the inside of the impeller are not designed as lost cores, but as reusable cores. The main concept of a preferred embodiment of the present invention lies in designing the cores which define the flow channels, in a divided manner, so that by way of the removal firstly of one part of the core, a necessary free space is created which permits one or more further core parts to move such that they may also be disengaged from undercuts in the flow channel.

Thus, the cores which define the flow channels in the inside of the impeller are formed in each case of at least two core parts. Firstly, the impeller is cast in the usual manner, i.e. with injection molding of plastic or with die-casting of metal. Hereinafter, for the sake of simplicity, only the term injection molding is used, wherein it is to be understood that this, within the context of the invention, also includes die-casting of metal. After the injection molding, firstly only a first core part is pulled out of the flow channel. This core part is selected or configured such that it is not in engagement with undercuts in the flow channel, but may be pulled freely out of the flow channel in a certain pulling direction. This pulling direction preferably runs essentially radially in the direction of the course of the flow channel, i.e., it is not the case of a purely radial movement, but of a movement along a curved path.

By way of pulling the first core part out of the flow channel, a free space is created in this, which hereinafter is used to be able to move the second or further core parts such that they may be disengaged from undercuts in the flow channel. Such undercuts may result due to the curvature of the blades in the impeller. This curvature is effected for optimizing the flow guidance, for example such that no constant radius of curvature is given, but the radius of curvature changes in the radial course of the blade. Moreover, it is also possible for the blades to be curved in two directions. Thus, it occurs that no continuous uniform curvature results, along which a core may be pulled out of the flow channel between the blades. The pulling direction of the second core part is preferably likewise essentially radially to the outside, i.e., toward the outer periphery, wherein it is to be understood that the pulling direction results essentially also from the course of the flow channel, i.e., ideally along a curved path towards the outer periphery of the impeller. The relative movement transverse to this pulling direction is thus effected at an angle to this pulling direction, preferably essentially normally to the pulling direction of the second core part, so that this may be brought out of engagement with the walls of the flow channel, before and/or during the pulling movement. The second core part or a part of the impeller thereby moves into the free space which was created by the prior removal of the first core part.

As described, the pulling direction of the at least two core parts runs preferably essentially radially outwards along a curved path in the longitudinal direction of the flow channel. According to a first preferred embodiment of the present invention, the at least two core parts of the cores, which define the flow channels in the inside of the impeller, in each case lie above one another in the axial direction with respect to the impeller rotation axis, and the relative movement between the impeller and the core parts is effected essentially in the axial direction. For example, with this design, the cores are divided by a section which runs transversely to the longitudinal axis or later rotation axis of the impeller. Thereby, this section or the parting plane may run normally to the longitudinal axis, and in the individual case may also run inclined to this. The exact parting course or section course results essentially from the geometry of the flow channel and the type and position of the undercuts which are formed there and from which the cores must be disengaged. With the arrangement of the core parts lying above one another essentially in the axial direction, a free space results in the flow channel at an axial side in the longitudinal direction of the rotation axis of the impeller, after the removal of the first core part. A relative movement between the impeller and the core parts essentially in the axial direction, i.e., direction of the impeller or rotation axis, is required, in order to move the core part or the further core parts into this free space. The relative movement may also be a superimposed movement in the axial and peripheral direction of the impeller, depending on whether the partition plane of the cores is inclined to this rotation axis. The relative movement is preferably effected in the direction normally to the mentioned partition plane.

According to a further preferred embodiment of the present invention, the at least two core parts of the cores, which define the flow channels in the inside of the impeller, in each case lie above one another in the peripheral direction with respect to the impeller rotation axis, and the relative movement between the impeller and core part is effected essentially in the peripheral direction. For example, with this design, the section plane or partition plane extends through the core essentially in the radial direction, preferably along a curved path essentially in the direction of the curvature of the flow channel, which is defined by the core parts. With this design, after removal of a first core part, a free space is created at one of the sides of the flow channel in the peripheral direction. In order to move a second or further core part in this free space, a relative movement essentially in the peripheral direction is required, i.e., the impeller is rotated essentially about its rotation axis relative to the cores, before or during which the cores are pulled out of the impeller in their pulling direction, i.e. preferably essentially radially along the extension direction of the flow channels. With this preferred embodiment too, it is to be understood that the section plane or partition plane in the core does not need to run exactly in the radial direction or in the longitudinal direction of the flow channel, i.e., parallel to the rotation axis of the impeller, but may also extend inclined to this rotation axis. Accordingly, the relative movement may then also be a movement which results from a superposition of a movement in the peripheral direction and in the axial direction. For example, a combination of the two previously described possibilities of the division of the core is possible.

It is also to be understood that the core parts do not need to be pulled out of the flow channel in the same direction. It is conceivable for one or several core parts to be pulled radially inwardly out of the flow channel, while one or more other core parts are pulled radially outwardly out of the flow channel. Undercuts may also be formed in this manner. Moreover, it is to be understood that the described method of creating necessary free spaces for moving a second core part by way of previous removal of a first core part, is not limited to the use of two core parts. This preferred method may accordingly also be applied with several core parts, for example in a manner such that a third core part moves into a free space which was created by the prior removal of the second core part.

The relative movement between the impeller and the core part is preferably realized in that the impeller in at least one direction is freely movable transversely to the pulling direction of the core part. Thus, the relative movement between the impeller and the core part is produced automatically when the core part is pulled out of the flow channel. The core part which bears on a wall of the flow channel, then moves the impeller such that the core part may pass an undercut on the wall of the flow channel. For example, a force component transverse to the pulling direction is caused by a bearing surface of the core part and wall of the flow channel oblique to the movement direction or pulling direction of the core part, and this force component then effects the relative movement of the freely moving impeller transversely to the pulling direction. The direction transverse to the puling direction of the core, as described above, is preferably in the peripheral direction or axial direction with respect to the rotation axis of the impeller, wherein a movement in the superposition of both directions may also result. Since it is merely a question of the relative movement between the impeller and cores, it is also conceivable instead of allowing a movement of the impeller, to allow the movement of the cores or core parts in a direction transversely to the pulling direction of the core parts. It is also conceivable for the relative movement to result from the superposition of movements of the core parts as well as of the impeller.

According to a particularly preferred design of the method of the present invention, the cores which define the flow channels in the inside of the impeller, are in each case formed of at least three core parts. The design of the flow channel by way of three or more core parts also permits the design of complex geometries of the flow channel by way of reusable core parts. The cores are thus divided into several parts, such that the removal of one core part in each case creates a free space which subsequently permits the removal of a further core part, which otherwise would not be removable from the flow channel due to the geometry of the walls of this flow channel.

Moreover, it is preferable for at least two core parts of the cores, which define the flow channels in the inside of the impeller, to be attached in each case to different parts of the outer tool in a movable manner. The outer tool is usually divided into two parts and may be opened after the injection molding by way of moving the two parts apart, so that the impeller may be removed from the tool, as is usual with injection molding or die-casting. The partition plane of the outer tool thereby extends preferably essentially normally to the rotation axis of the impeller. It is preferable for the core parts of the cores to be arranged such that a part of the core parts is arranged on the one part of the outer tool and another part of the core parts is arranged on the other part of the outer tool. If for example, the first core parts are arranged on the first part of the outer tool, then after the removal or the pulling of the first core parts from the flow channels, the outer tool may be opened by way of moving the first part and the second part of the outer tool apart. Thereby, then also the first core parts with the first part of the tool may be moved away from the second part of the tool and from the other core parts. An additional free space for the movement of the second and further core parts as well as for the relative movement to the impeller is created by way of this.

According to a further preferred design of the method of the present invention, at least two core parts of a core are guided on one another in a movable manner. For this, a guide path may be formed in one core part, in which guide path a further core part is guided in a movable manner. The guiding of the core parts to one another simplifies the construction of the tool, since a separate guide in the outer tool does not need to be provided for each core part. Moreover, the core parts may also be moved together in such a manner. For example, it is possible for one core part to be moved firstly alone by a certain path, and then in the further course of movement to move together with a further core part. In this case, it is useful for these two core parts to be connected to one another or movable guided on one another, in a suitable manner.

As already described above, in a special design of the method, it is possible for the cores which define the flow channels in the inside of the impeller, in each case to comprise at least one core part which is pulled radially inwardly out of the flow channel. Further core parts are then preferably pulled radially outwardly out of the flow channel. Thus, it is preferable for the part of the core which is largest with regard to volume, to be moved radially outwardly out of the flow channel, since more space is available there, than in the central region of the impeller, where only the space which later forms the suction port of the impeller is present. However, depending on the geometry of the flow channels, it may be useful to remove a core part radially inwardly out of the flow channels. Thus, it is conceivable firstly for one core part to be moved radially outwardly, by which means a free space is then created, which permits a movement of the second core part which is then removed radially inwardly out of the impeller. Subsequently, further core parts may be then removed radially outwardly. The radially inwardly moving core parts may be formed by a core which collapses inwardly. In order to create the free space which permits the collapse of the core radially inwardly, it is preferably for a further central core element, which defines the entry opening or the suction port of the impeller, to be previously pulled out of the impeller in the axial direction, i.e., parallel to the rotation axis of the impeller.

Apart from the previously described method, the present invention also relates to a pump impeller which is preferably manufactured with this method. The pump impeller according to a preferred embodiment of the present invention includes two axially distanced cover plates and impeller blades arranged between the cover plates, wherein flow channels are defined between the impeller blades. According to a preferred embodiment of the present invention, the two cover plates and the impeller blades thereby are manufactured as one piece by injection molding. For example, the impeller according to a preferred embodiment of the present invention is manufactured in one part in a casting procedure and is not composed of several parts. Thereby, the impeller may be formed by injection molding from plastic or metal, i.e., with die casting.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings an embodiment which is presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. The words "inwardly" and "outwardly" refer to directions toward and away from, respectively, the geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

Figure 1:
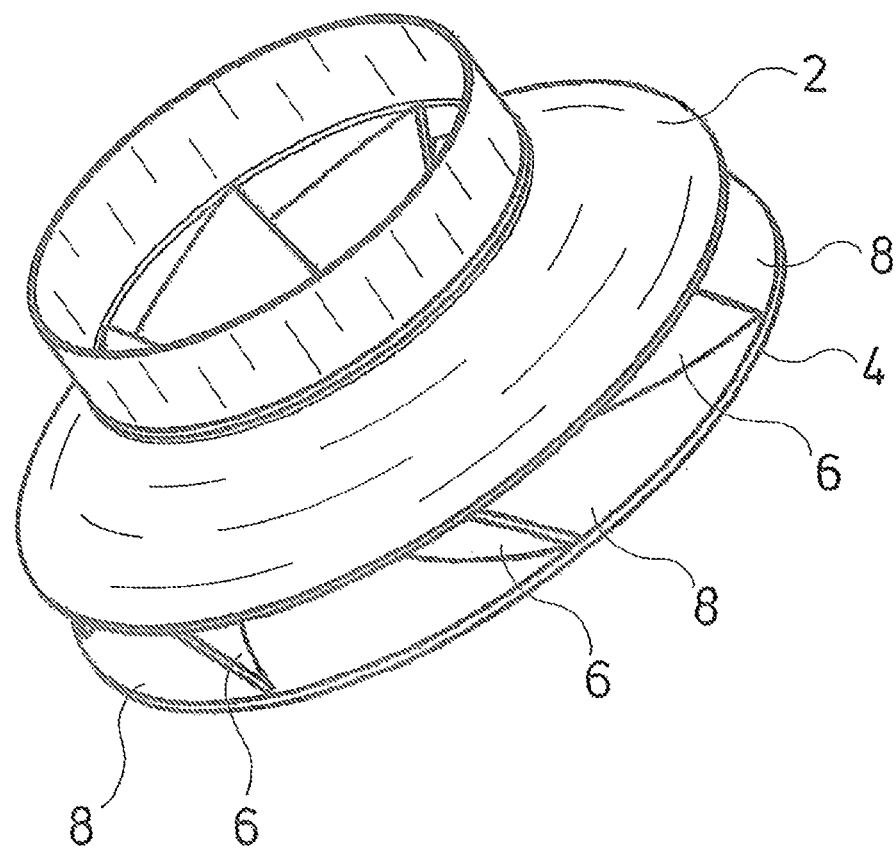
FIG. 1 is a perspective view of a pump impeller according a preferred embodiment of the present invention.
Figure 2:
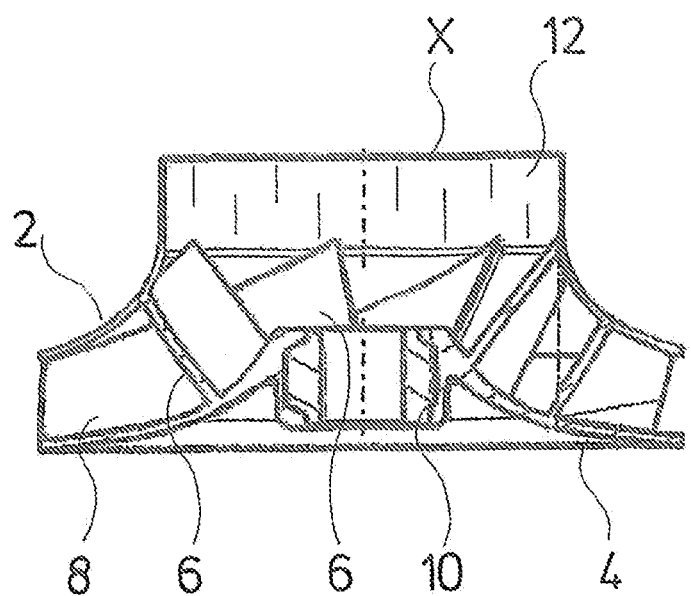
FIG. 2 is a sectioned view of the pump impeller according to FIG. 1.

Referring to the drawings in detail, wherein like numerals indicate like elements throughout the several views, FIGS. 1 and 2 show an example of an impeller according to a preferred embodiment of the present invention. The impeller 1 preferably includes two cover plates 2, 4 which are distanced to one another, between which impeller blades 6 are formed. Flow channels 8 are defined between the impeller blades 6 and extend radial outwardly, essentially from the center of the impeller 1 along a curved path, and there are open towards the periphery. With this impeller 1, it is the case of a typical impeller 1 for a centrifugal pump or rotatory pump. A hub 10 for connection to a rotor shaft is formed centrally in the cover plate 4. The cover plate 2 is open in the center and there defines a suction port 12. As may be recognized in the sectioned view in FIG. 2, with regard to the impeller according to a preferred embodiment of the present invention, the cover plates 2, 4 as well as the impeller blades 6 lying therebetween are formed as one piece. This is effected by way of the impeller with the cover plates 2, 4 as well as the guidance blades 6 being manufactured as one piece as a cast component with injection molding of plastic, or of metal, i.e., with die casting. Thus, subsequent assembly procedures of cover plates 2, 4 as well as impeller blades 6, is done away with. Moreover, complex geometries of the flow channels 8 may be formed by casting, so that the flow channels 8 may be shaped in a manner which is optimized with regard to flow technology. Such an impeller 1 cast as one piece may be designed by way of injection molding of metal or plastic as is explained hereinafter.

Figure 3:
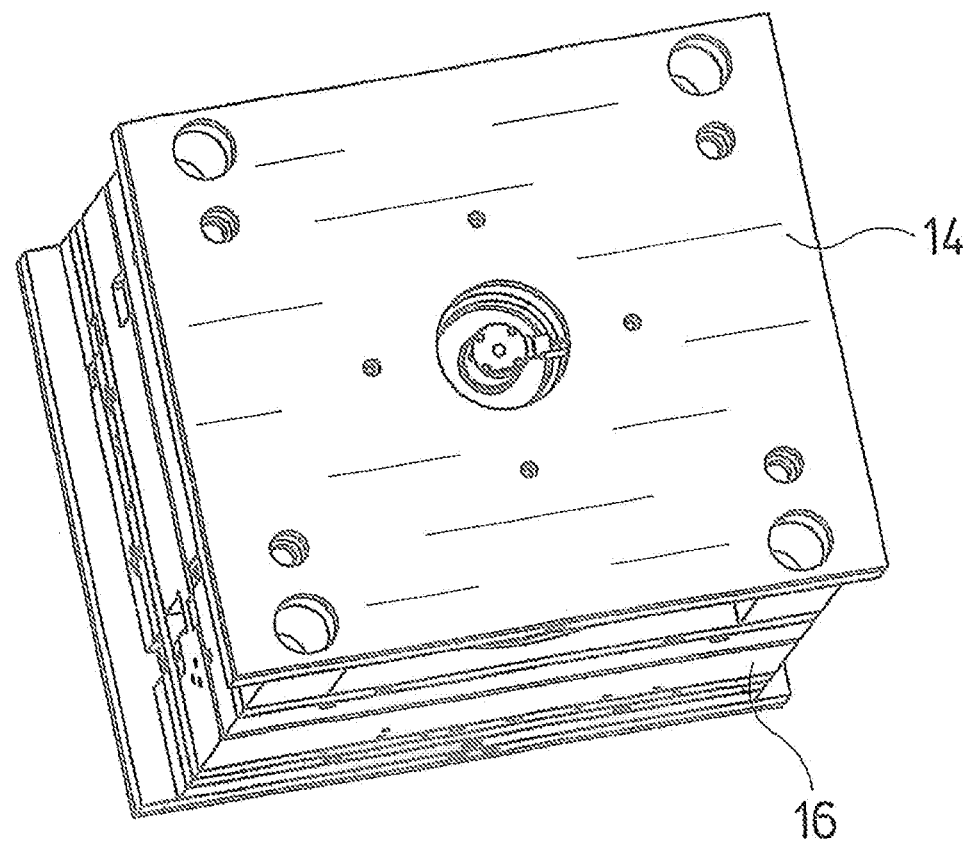
FIG. 3 is a perspective view of a casting tool for forming a pump impeller according to a preferred embodiment of the present invention, in a closed condition.

FIG. 3 shows an injection molding tool for forming an impeller 1 according to the preceding description, in the closed condition. The injection molding tool consists essentially of two outer tool parts or mould parts 14, 16. The outer mould parts 14, 16 may be moved apart, in order to remove the cast impeller 1 and define essentially the outer contour of the impeller 1.

Figure 4:
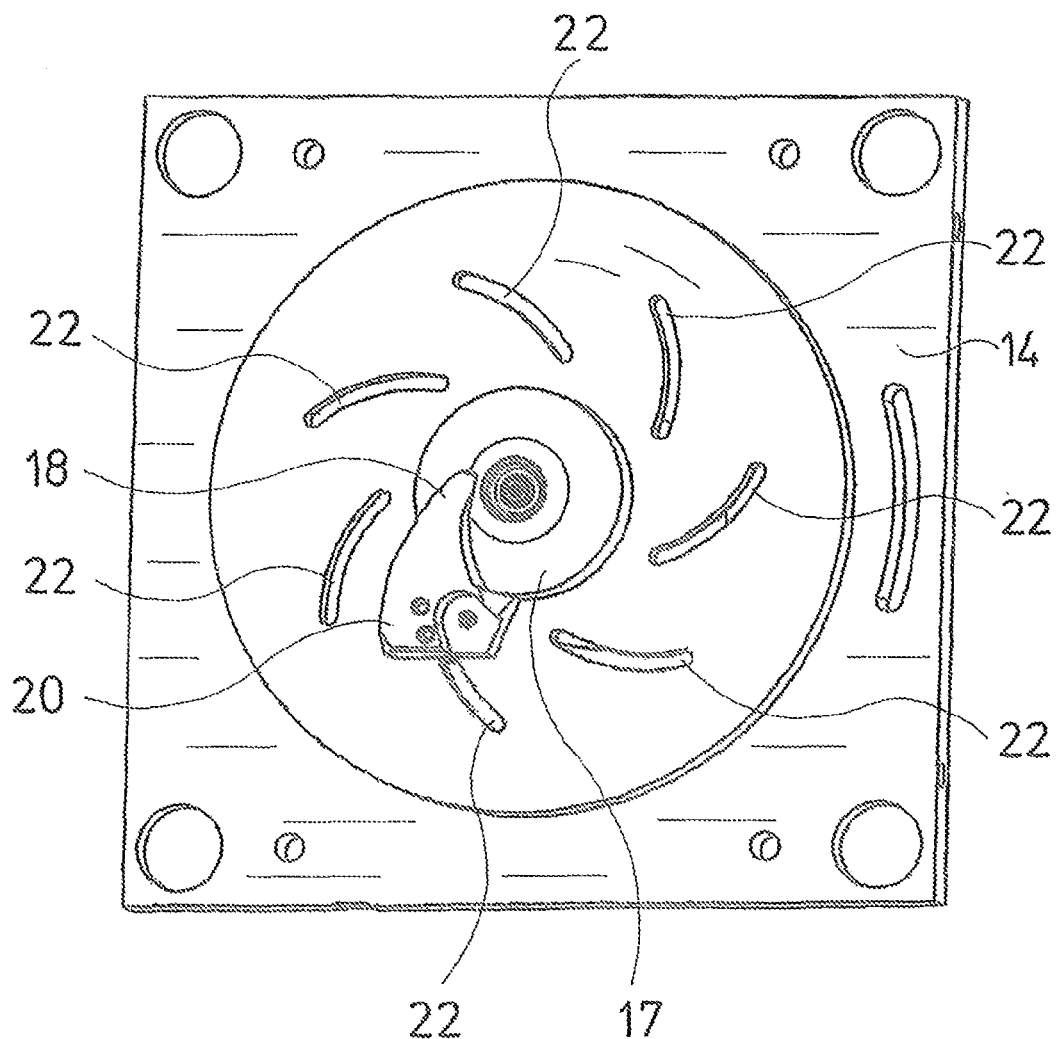
FIG. 4 is a schematic plan view of an inner side of a first part of the tool according to FIG. 3.

FIG. 4 schematically shows a plan view of the inner side of the first outer mould part 14. Apart from the actual mould 17 which defines the outer side of the cover plate 4 on casting, first core parts 18, of which only one is shown in FIG. 4, are attached to the first, outer mould part 14 for the in total seven flow channels 8. The core parts 18 with further core parts define the flow channels 8 on casting. The first core part 18 is attached to a first slide 20, which is movably guided in a guide path 22 in the outer mould part 14. The guide paths 22 define the movement directions or pulling directions of the first core parts 18, and run in a curved manner and slightly obliquely, outwardly in the radial direction from the inner periphery. The slide 20 with the first core parts 18 may be pulled along these curved guide paths 22 in the curved direction defined by the guide paths 22, out of the formed flow channel 8 towards the outer periphery. The curvature of the guide paths 12 and their direction thereby runs essentially in the extension of the flow channels 8 to be molded.

Figure 5:
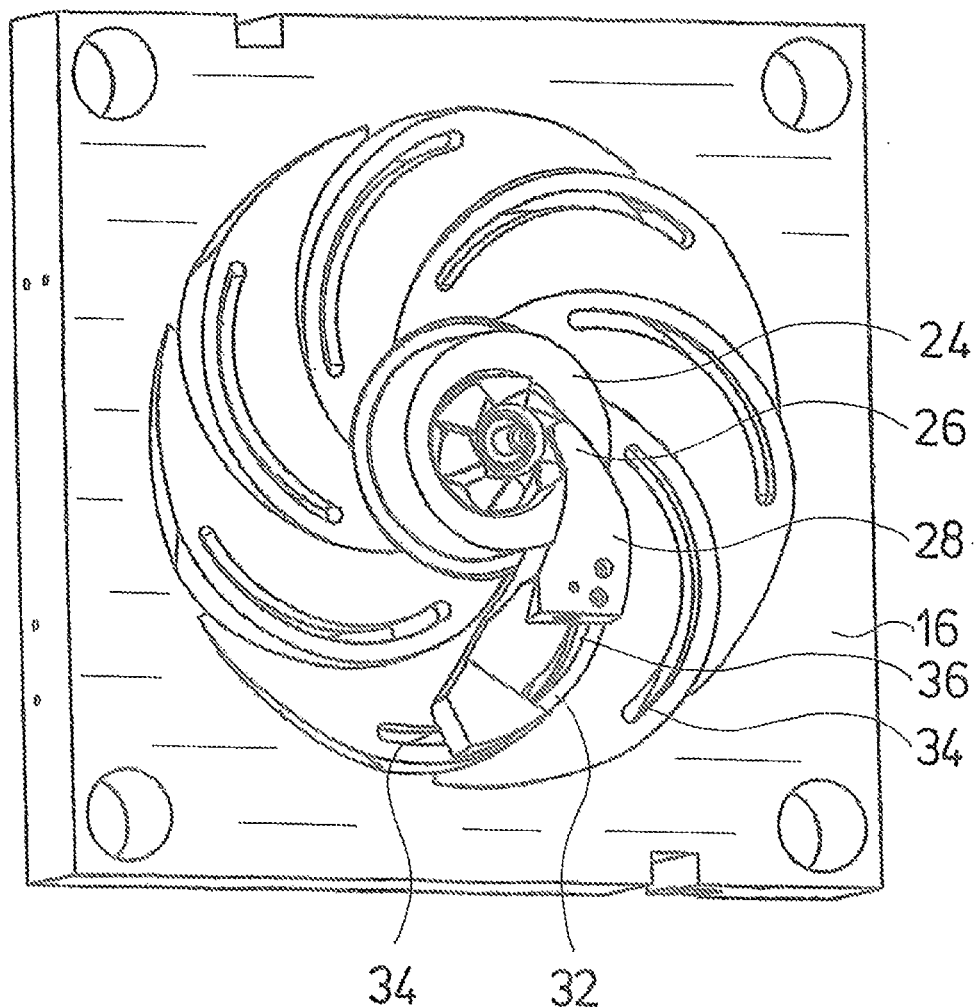
FIG. 5 is a schematic plan view of an inner side of a second part of the tool according to FIG. 3.

FIG. 5 shows a plan view of the inner side of the second outer mould part 16. Apart from the mould space or the mould 24 which defines the outer side of the cover plate 2 on casting, further core parts for forming the flow channels 8 are provided on the second outer mould part 16, specifically a second core part 26 on a second slide 28, and a third core part 30 on a third slide 32. In each case, only one second core part and one third core part 30 are shown also in FIG. 5. The third slides 32 are movably guided along the guide paths 34 in curved guide paths 34. Thereby, the guide paths 34 extend obliquely and arcuately to the radial direction, outwardly from the impeller 1 to be molded. The guide paths 34 thereby extend essentially in a direction in the extension of the flow channels to be formed. Thereby, the guide paths 34 additionally are yet inclined to the cross-sectional plane which extends normally to the rotation axis X of the impeller to be formed. This course of the guide paths 34 permits the third slide 32 with the third core part 30 to be moved in the extension of the flow channel 8 out of this, to the outside at the outer periphery of the impeller. In each case a guide path 36 is formed on the third slide 32, on or in which guide path the second slide 28 is guided in a movable manner. The guide path 36 thereby extends likewise in a curved and inclined manner, essentially in the radial direction in the extension of the flow channel 8 to be formed, to the outside, so that the second slide 28 with the second core part 26 may be moved in the direction of the guide path 36, towards the outer periphery, out of the flow channel 8 to be formed.

Figure 6:
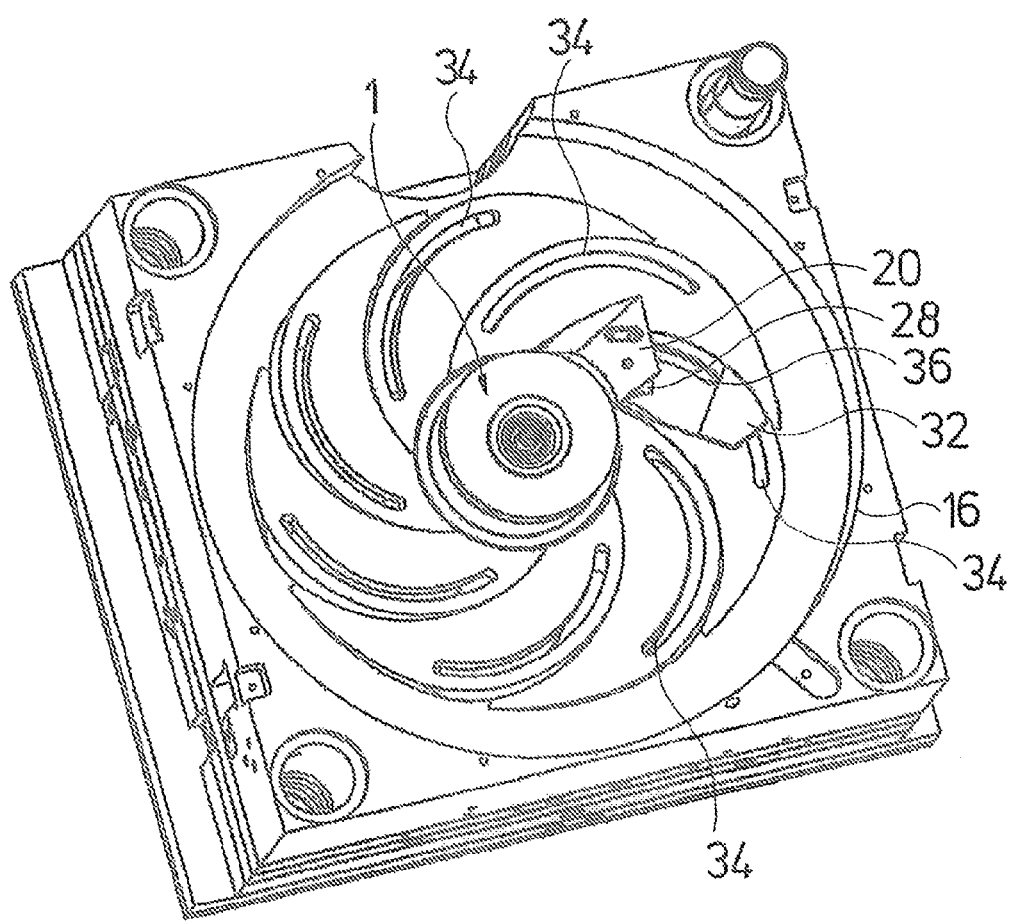
FIG. 6 is a plan view of the second part of the tool according to FIG. 5, with an impeller located in the tool, and cores located in the impeller.
Figure 7:
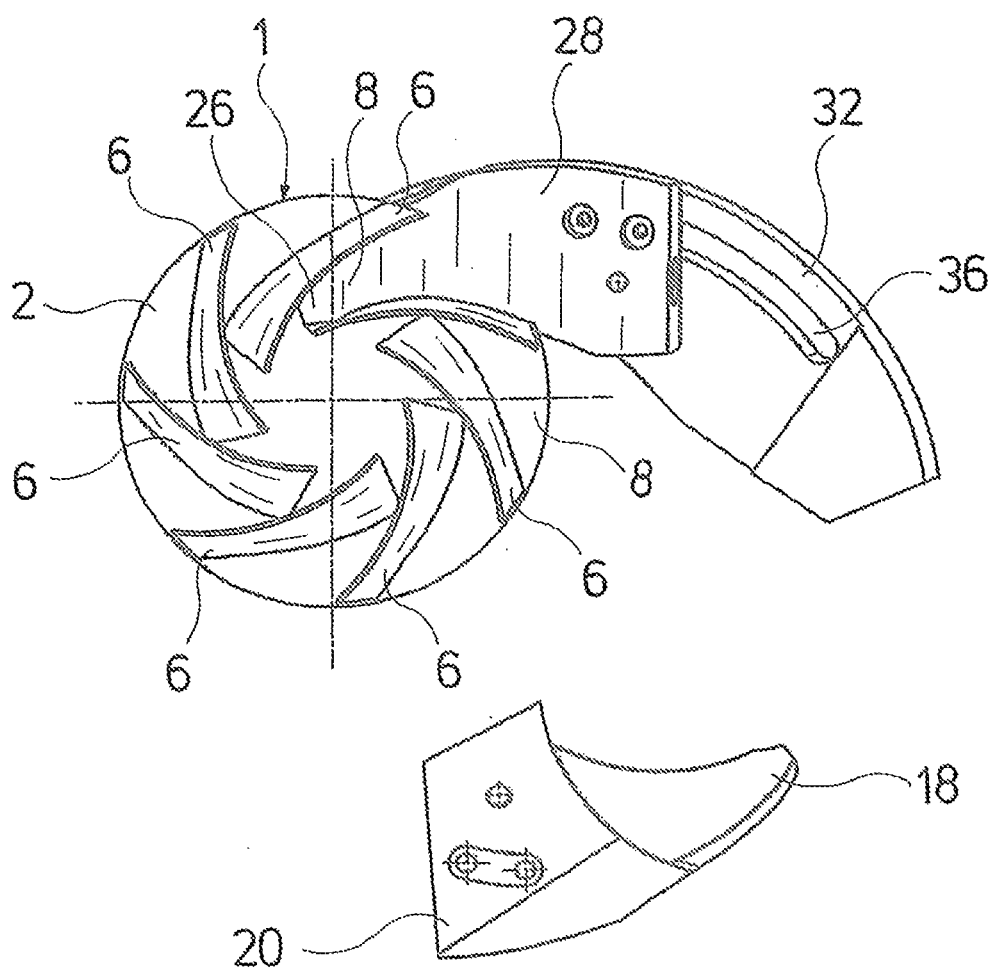
FIG. 7 is a schematic view of the removal of a first core part.

FIG. 6 shows a plan view of the inner side of the second outer mould part 16, similarly to the view in FIG. 5, but with the molded impeller 1 lying therein, wherein the three core parts 18, 26 and 30 are still located in the impeller 1. In each case, only one core arrangement consisting of the core parts 18, 26 and 30, is shown in this view too. It is to be understood that corresponding core arrangements may be placed at the remaining six guide paths 34. Moreover in FIG. 6 the first slide 20 with the first core part 18 is shown, although this is actually attached on the first outer mould part 14, as described above. For example, before opening the mould parts 14 and 16, the first slide would have to firstly be moved out of the impeller, in order then to be able to be moved away together with the first outer mould part 14. However, in order to better describe the mould removal procedure of the cores for the flow channels 8, the first slide 20 is shown independently of the first, outer mould part 14 in FIG. 6.

The exact course of the mould removal procedure is now described by way of FIGS. 7-10. For this, in each case a plan view of the impeller 1 is shown in the FIGS. 7, 9 and 10, wherein the cover plate 4 has been omitted for an improved illustration of the movement of the core parts. The cover plate 2 also is shown in a merely schematic manner. In the first step, the first core part 18 with the first slide 20 is moved in the direction of the guide path 22 out of the flow channel 8, radially outwardly in this. Subsequently, the outer tool consisting of the mould parts 14, 16 is opened, wherein the slide 20 together with the outer mould part 14 is moved away from the impeller. By way of the removal of the first core part 18, a free space is created in the flow channel 8 and this free space permits the movement of the further core parts.

Figure 8:
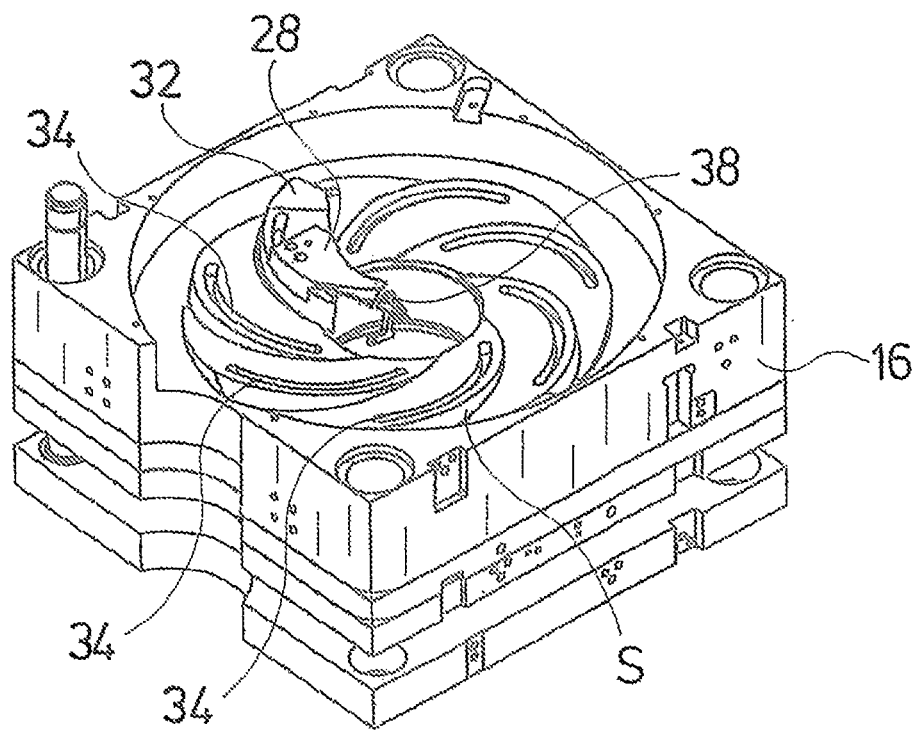
FIG. 8 is a schematic view of the removal of an inner core part.

In the second step, the inner core parts 38, of which only one is shown in FIG. 8, are moved radially inwardly out of the molded flow channels 8. The cast impeller and also a part of the mould are not represented in FIG. 8 for the purpose of a better illustration. The inner core parts 38 are pivotable about pivot axes S, and together form an inner core which may collapse radially inwardly by way of pivoting the inner core parts 38.

Figure 9:
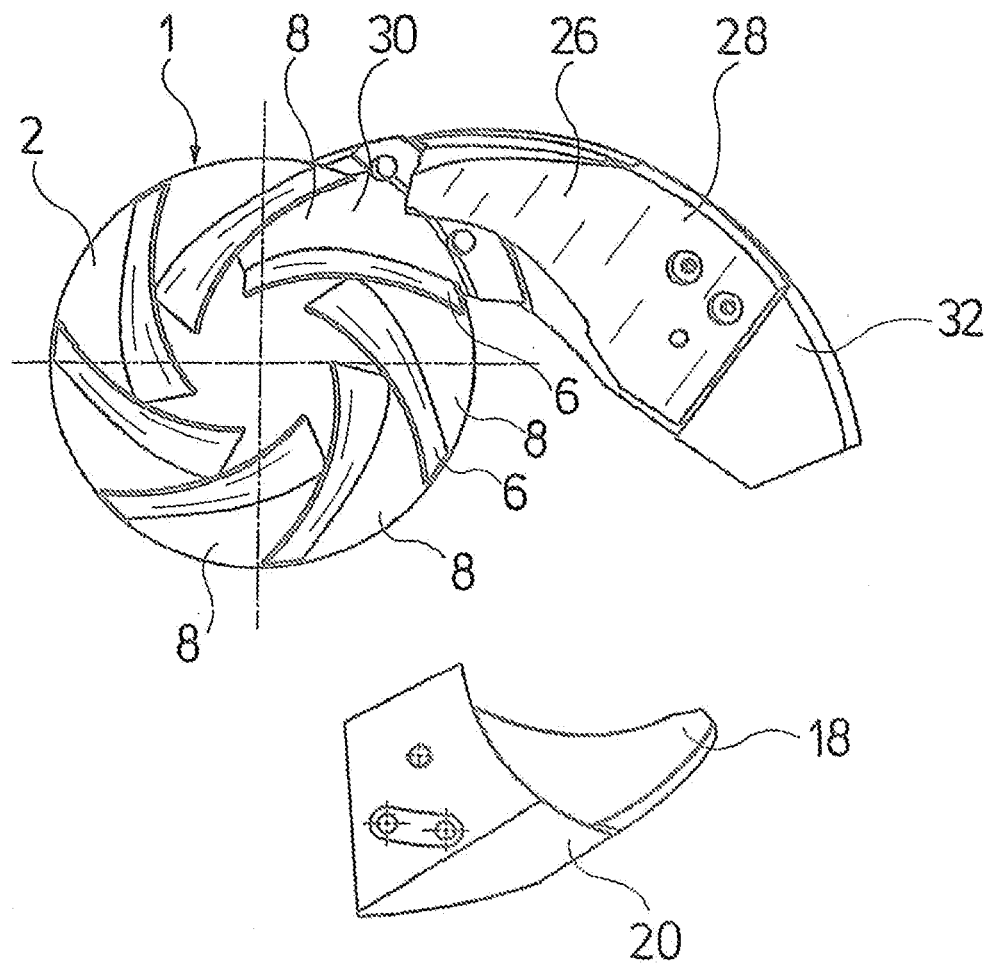
FIG. 9 is a schematic view of the removal of a second core part.

In the next step which is represented in FIG. 9, the second slide 28 on the third slide 32 is pulled along its guide path 36 out of the flow channel 8. A further free space which then permits the removal of the third core 30 is created in the flow channel 8 by way of this. The free space created by the removal of the second core part 26 permits the impeller 1 to be able to move in the direction of the rotation axis X, i.e. normally to the plane of the drawing in FIGS. 7, 9 and 10, relative to the third core part 30, when the third core part 30 is pulled out of the flow channel 8. In this manner, it is rendered possible for the core part 30 to become disengaged from the undercuts caused by the contour of the impeller blades 6, and be pulled with the third slide 32 along the guide path 34 out of the flow channel 8. The relative movement between the impeller 1 and the third core part 30 in the axial direction X, i.e., in a direction transverse to the movement direction or pulling direction of the third core part 30 and which is defined by the course of the guide path 34, is caused by the movement of the third core part 30. I.e. no separate drive for the movement of the impeller 1 is necessary. The third core part 30 on pulling-out, presses the impeller 1 automatically in the desired axial direction, so that the third core part 30 may be pulled out of the flow channel 8. Subsequently the impeller 1 falls back into its initial position. It is merely necessary to ensure the movement possibility of the impeller 1 in the axial direction X, in the outer tool, i.e., the outer mould part 16.

Figure 10:
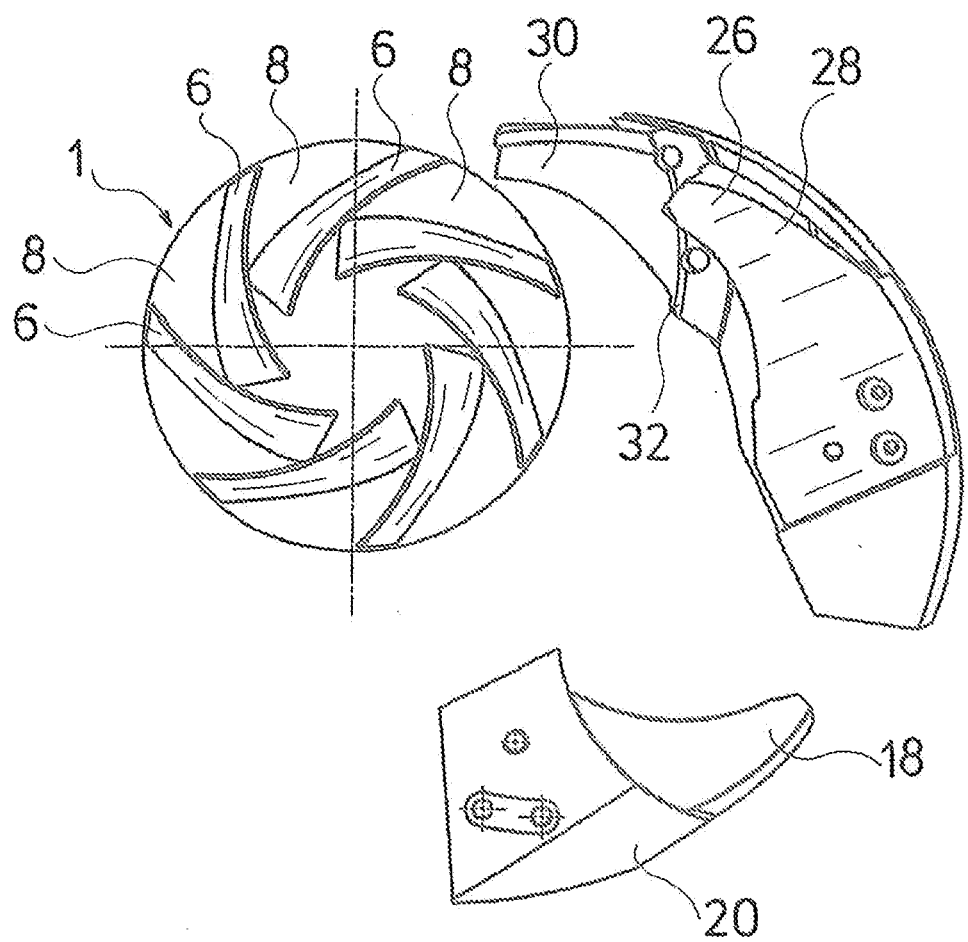
FIG. 10 is a schematic view of the removal of a third core part.

Finally, the flow channels 8 are then completely removed from the mould, as is represented in FIG. 10, and the impeller 1 may be removed out of the outer mould part 16 by hand or by robots in the known manner. Subsequently, the cores and the outer mould parts 14, 16 move back into their initial position or closed position and the next casting procedure may begin.

It is to be recognized that the concept which is essential to a preferred embodiment of the present invention, lies in dividing the cores which form the flow channels 8 of the impeller, such that individual core parts 18, 26, 30, 38 may be removed or pulled out of the flow channels 8 one after the other. Thereby, the firstly removed core parts release a space in the flow channel 8, which permits a movement of the core parts which are to be removed subsequently, relative to the impeller 1 in a direction transverse to the actual pulling or removal direction of the core parts. It is thus possible for the core parts to be able to disengage from undercuts which are located in the actual pulling direction or movement direction, and thus likewise to be able to pull them out of the flow channel 8. By way of the divided design of the cores, it is thus also possible to design complex geometries of flow channels 8 without the use of lost cores, i.e., with reusable cores. The complex geometries of the flow channels 8 result in particular by way of the fact that the blades 6 do not have a constant radius of curvature, but are curved to different degrees over their extension. Moreover, the flow channels 8, as in the previous example, are often not only curved in one plane but yet also in a second plane. Such a design entails a single-piece core not being able to be pulled out of the flow channel 8, since thus undercuts are given, behind which the core engages.

In the shown example, the flow channel is defined by four core parts. However, it is to be understood that one may also apply more or less core parts, depending on the geometry of the flow channel 8 to be molded. The partition planes or section planes, in which the cores are divided, may also be situated differently. Thus, individual core parts which are layered essentially in the axial direction X in the shown example, may for example be layered completely or partly also in the peripheral direction with respect to the rotation axis X. In this case then, as the case may be, alternatively or additionally, a relative movement of the impeller 1 to the cores in the peripheral direction would then be necessary.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for manufacturing a pump impeller (1) with cores which define flow channels (8) inside of the pump impeller (1), each core being formed of at least two core parts, including a first core part and a second core part, the method comprising:
   providing the first core part (18, 26) such that the first core part (18, 26) does not engage with undercuts in the flow channels (8), wherein the first core part (18, 26) can be freely pulled out of at least one flow channel when the first core part (18, 26) is attached on a first slide (20, 28);
   movably guiding the first slide (20, 28) along a guide path (22, 36) in an outer mold part (14, 16), wherein the guide path (22, 36) defines the direction in which the first core part (18, 26) moves, and wherein the guide path (22, 36) runs arcuately and slightly obliquely in a radial direction outwardly away from an inner periphery of the pump impeller (1) and the first core part (18, 26);
   pulling the first core part (26) radially out of at least one flow channel (8) along an arcuate path, after injection molding; and
   subsequently, producing an automatic relative movement between the pump impeller (1) and the second core part (30) in a direction transverse to a pulling direction of the second core part (30), before or during the pulling-out of the second core part (30).

2. The method according to claim 1, wherein each core part has a pulling direction that runs essentially radially outwardly along a curved path in a longitudinal direction of each respective flow channel (8).

3. The method according to claim 1, wherein the at least two core parts lie above one another in an axial direction (X) with respect to an impeller rotation axis (X), and wherein the relative movement between the impeller (1) and the at least two core parts is effected essentially in the axial direction (X).

4. The method according to claim 1, wherein the at least two core parts lie above one another in a peripheral direction with respect to an impeller rotation axis (X), and wherein the relative movement between the impeller (1) and the at least two core parts is effected essentially in the peripheral direction.

5. The method according to claim 1, wherein the relative movement between the impeller (1) and the at least two core parts is realized by way of the impeller (1) being freely movable in at least one direction transverse to the pulling direction of the second core part (30).

6. The method according to claim 1, wherein each core comprises at least three core parts.

7. The method according to claim 6, wherein the first core part (18) is attached on a first outer mold part (14) of an outer tool, and the second core part (30) is attached on a second outer mold part (16) of the outer tool, and wherein the method further comprises moving apart the first part of the outer tool and the second part of the outer tool after pulling out the first core part (18) is pulled out.

8. The method according to claim 1, wherein the at least two core parts are movably attached on different outer mold parts (14, 16) of an outer tool.

9. The method according to claim 1, wherein the at least two core parts are movably guided with respect to one another.

10. The method according to claim 1, wherein each core comprises at least one inner core part (38) which is pulled radially inwardly out of at least one flow channel (8).

* * * * *